United States Patent
dos Santos e Lucato et al.

(10) Patent No.: US 9,812,234 B2
(45) Date of Patent: Nov. 7, 2017

(54) HERMETICALLY SEALED ELECTRICAL PENETRATOR ASSEMBLY

(71) Applicants: Teledyne Instruments, Inc., Thousand Oaks, CA (US); Teledyne Scientific & Imaging, LLC, Thousand Oaks, CA (US)

(72) Inventors: Sergio L. dos Santos e Lucato, Thousand Oaks, CA (US); Alan D. McCleary, Saint Augustine, FL (US); Joseph R. Tabarracci, Deland, FL (US); John Bradley Hunter, Basking Ridge, NJ (US); Janet B. Davis, Thousand Oaks, CA (US)

(73) Assignees: TELEDYNE SCIENTIFIC & IMAGING, LLC, Thousand Oaks, CA (US); TELEDYNE INSTRUMENTS, INC., Thousand Oaks, CA (US)

( * ) Notice: Subject to any disclaimer, the term of this patent is extended or adjusted under 35 U.S.C. 154(b) by 0 days.

(21) Appl. No.: 15/061,791

(22) Filed: Mar. 4, 2016

(65) Prior Publication Data
US 2017/0256340 A1    Sep. 7, 2017

(51) Int. Cl.
| H01R 4/70 | (2006.01) |
| H01R 13/523 | (2006.01) |
| H01B 17/58 | (2006.01) |
| H02G 15/013 | (2006.01) |

(52) U.S. Cl.
CPC ......... *H01B 17/583* (2013.01); *H02G 15/013* (2013.01)

(58) Field of Classification Search
None
See application file for complete search history.

(56) References Cited

U.S. PATENT DOCUMENTS

| 8,901,440 B2 * | 12/2014 | Rousseau | ............ H01R 13/523 |
| | | | 138/111 |
| 8,968,018 B2 | 3/2015 | Sivik et al. | |
| 2014/0188005 A1 | 7/2014 | Kay | |

FOREIGN PATENT DOCUMENTS

| EP | 2882041 A1 | 6/2015 |
| WO | 2013048973 A2 | 4/2013 |
| WO | 2014094163 A1 | 6/2014 |

OTHER PUBLICATIONS

Extended European search report dated May 3, 2017 for European patent application No. 17158157.2.

* cited by examiner

*Primary Examiner* — Dimary Lopez Cruz
(74) *Attorney, Agent, or Firm* — Procopio, Cory, Hargreaves & Savitch, LLP

(57) ABSTRACT

A penetrator device has an outer housing of non-conductive, insulating material having a through bore, at least one conductive pin formed in one or two parts extending through the housing and having a first end portion and a second end portion extending out of the respective first and second ends of the housing, a first cladding layer bonded over the first end portion of the pin to form a first bonded assembly, a second cladding layer bonded over the second end portion of the pin to form a second bonded assembly, and the material of the first and second cladding layer comprising a corrosion resistant conductive material different from the pin material.

12 Claims, 6 Drawing Sheets

HERMETICALLY SEALED ELECTRICAL PENETRATOR ASSEMBLY

BACKGROUND

1. Field of the Invention

The present invention relates generally to electrical penetrator assemblies for feed through of electrical power through the wall of a pressurized vessel or the like, and is particularly concerned with hermetic sealing of exposed end portions of an electrical penetrator assembly for use in subsea or other harsh environments.

2. Related Art

Electrical penetrators are used to power subsea electric submersible pump (ESP) equipment and the like which pump hydrocarbons in oil well installations, and also in other applications such as high pressure downhole electrical penetrations and other penetrations to provide power to various types of subsea equipment. The penetrator extends through the wall or bulkhead of the vessel in which the equipment is located, and is normally connected to power cables at one end for connecting the equipment to an external power source. In an ESP application, the connection or penetrator cannot be isolated from the pumping pressure for practical reasons. This creates an extreme environment for the connector or penetrator in terms of pressure, temperature, and high voltage. The penetrator must transfer power to the motor as well as maintaining a pressure barrier for both internal pressure created by the ESP and external pressure caused by the depth in seawater. The temperatures are increased due to fluid temperatures as well as resistive heating of the electrical elements.

In a typical electrical penetrator or feed through arrangement, a one-piece conductor such as a conductive connector pin extends through a bore in an insulating sleeve or body, with appropriate seals brazed or bonded between the outer body and pin at each end of the penetrator assembly. The penetrator extends through a bore in an outer connector body or shell. In some cases, multiple penetrators extend through the outer shell. One end of the penetrator is exposed to a relatively high pressure environment inside a subsea housing, and a second end is exposed to ambient pressure of the subsea environment. In one known arrangement, the seals comprise metal sealing sleeves which seal the insulating sleeve of ceramic or the like to the conductive connector pin body. Due to the heat involved during the brazing or bonding process, the parts expand by different amounts. Once the penetrator assembly is allowed to cool, the different rates of shrinkage of the different material parts causes stress on the ceramic housing material, brittle bonds, or both, and may lead to failure of the seal. Thus, known penetrator sealing or encapsulation methods involving surface plating or coating may not stand up to the wear and abrasion that can occur in handling, assembly, and repeated subsea mate/de-mate processes, and corrosion may occur at the brazed or welded interfaces.

SUMMARY

Embodiments described herein provide for a physically encapsulated or hermetically sealed electrical penetrator or connector assembly and method for use in subsea and other harsh environments.

According to one embodiment, an electrical penetrator or connector assembly is provided which comprises a housing or sleeve of insulating material such as ceramic having a through bore and front and rear ends, at least one conductive pin formed in one or two parts extending through the housing and having a forward end portion and a rear end portion extending out of the respective forward and rear ends of the housing, the forward end portion having a tip and the rear end portion having a rear end face, a first cladding layer bonded over the forward end portion of the pin including the tip to form a first bonded assembly, and a second cladding layer bonded over the rear end portion of the pin including the rear end face to form a second bonded assembly, the cladding material comprising a corrosion resistant conductive material different from the pin material.

In one embodiment, a first metal sleeve is brazed or welded over the interface between the insulating sleeve and first bonded assembly, and a second metal sleeve is brazed or welded over the interface between the insulating sleeve or housing and the second bonded assembly. In one embodiment, the conductive pin comprises first and second conductors each having a first end and a second, outer end, and the first end of the first conductor has a bore with the first end of the second conductor slidably engaged in the bore. An internal sliding contact band may be provided between the opposing faces of the bore and first end of the second conductor, to maintain electrical contact between the conductors as they move inwardly and outwardly. The interface between the first and second conductors may be located in the rear end portion of the conductive pin within the second cladding layer in one embodiment, or may be within the bore in the insulating sleeve in other embodiments.

The cladding layer may be bonded to the conductor end portions via brazing with a braze filler or by eutectic bonding. The cladding material is a corrosion resistant metal or alloy which is inert or substantially inert to the subsea environment, unlike the conductive pin which is typically of copper or the like. Suitable corrosion resistant metals or alloys are titanium or titanium alloy, nickel, stainless steel, Inconel® (an alloy of nickel, chromium and iron which is resistant to corrosion at high temperatures), and the like.

In another aspect, a method of manufacturing a physically encapsulated conductor end portion of a subsea penetrator assembly comprises forming a piece of cladding material having opposite first and second ends and a bore extending inward from a first end and having an inner end spaced from the second end, inserting an end portion of a conductor into the bore up to the inner end of the bore, joining adjacent surfaces of the bore and conductor end portion together by brazing or welding, machining external surfaces of the cladding to form a bonded assembly having a predetermined conductor end shape, and joining the bonded assembly to one end of an insulator housing of a subsea penetrator.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for an electrical penetrator assembly suitable for use in high pressure applications, such as in providing power for subsea equipment.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 1:
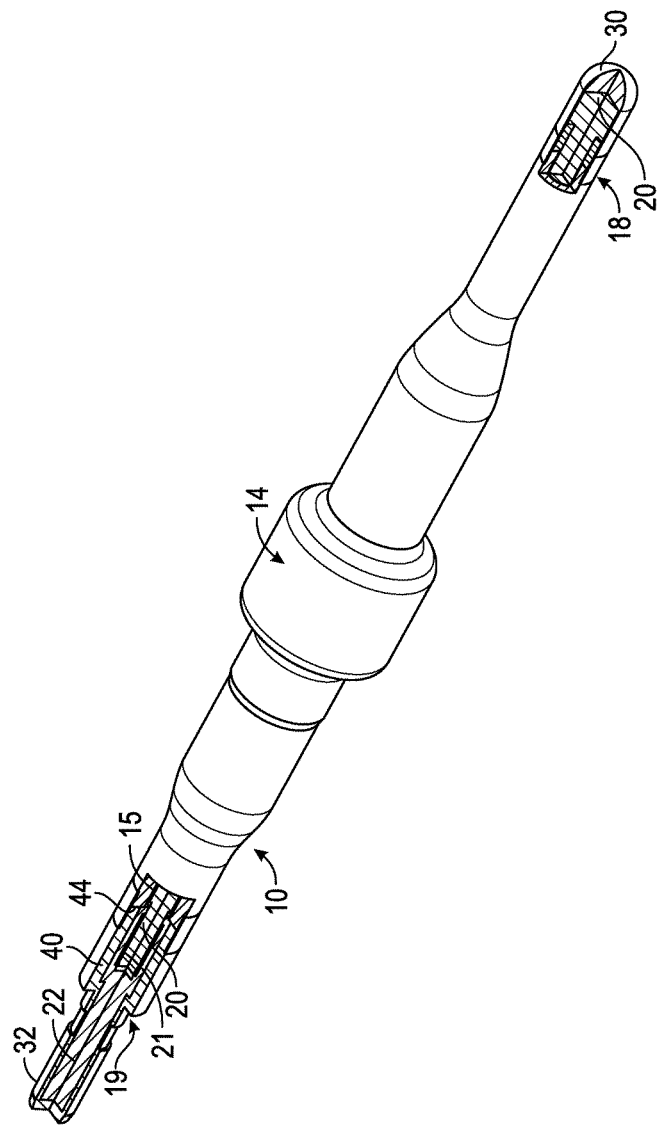
FIG. 1 is a perspective view of one embodiment of an electrical penetrator pin assembly, partially cut away to reveal the encapsulated, hermetically sealed conductor end portions.
Figure 2:
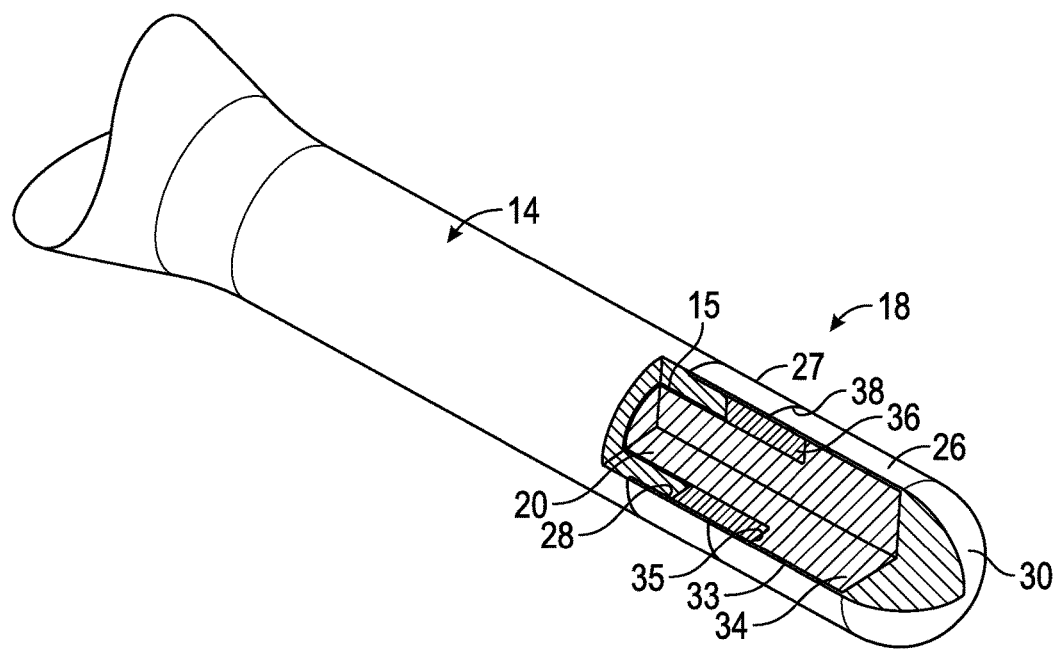
FIG. 2 is an enlarged cut away view of the front end portion of the penetrator pin assembly.
Figure 3:
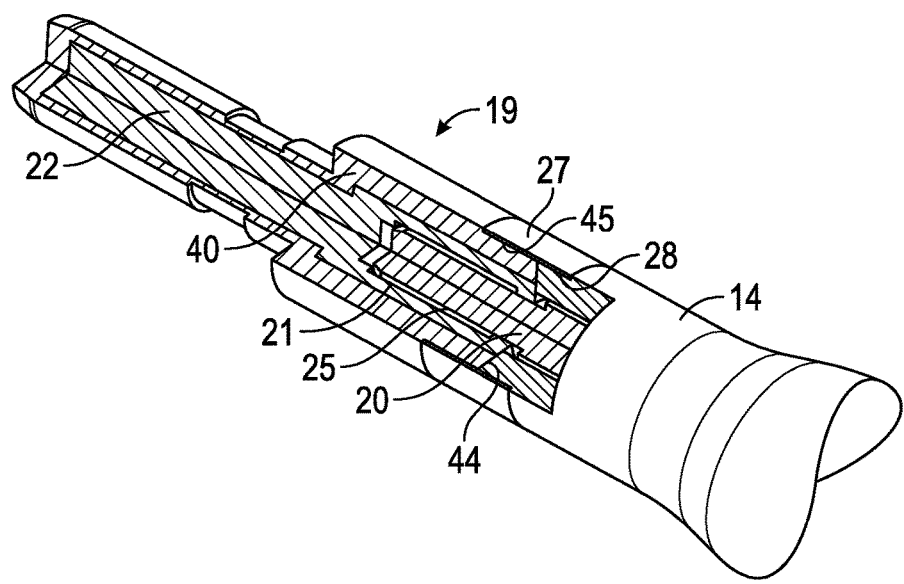
FIG. 3 is an enlarged, cut away view of the rear end of the penetrator pin assembly.

FIGS. 1 to 3 illustrate one embodiment of an electrical penetrator pin assembly or subassembly 10 for mounting in an outer penetrator housing (not illustrated) configured for extending through a wall or bulkhead of a subsea vessel or container. The pin subassembly 10 includes an outer body or housing 14 of ceramic or other insulating material, the housing 14 having a through bore 15. The outer body may be similar or identical to insulator bodies described in U.S. Pat. No. 8,968,018, the contents of which are incorporated herein by reference. A two part conductor pin extends through the bore in housing 14 and projects outwards at first and second ends of housing 14 to terminate in first and second encapsulated end portions or bonded assemblies 18, 19. In the illustrated embodiment, the first encapsulated end portion 18 has a rounded tip 30 for engagement in a corresponding socket in a mating subsea connector unit and the second encapsulated end portion terminates with an integral or separate cable connector 32, but both ends may terminated in rounded tips or with cable connectors in other embodiments, depending on the installation requirements.

In the illustrated embodiment, a first part 20 of the pin extends through the bore 15 in housing 14 and projects out of both ends of the housing. As best illustrated in FIG. 3, one projecting end of pin part 20 at the second encapsulated end portion 19 of the assembly is telescopically engaged in a bore 21 in second pin part 22 so that the overall length of the conductive pin assembly can vary slightly. An internal sliding contact band 25 mounted in an annular recess in bore 21 provides a sliding electrical engagement or contact interface between conductive pin parts 20 and 22 while permitting the pins to telescope inwardly and outwardly to compensate for various types of stress. This arrangement allow a small amount of relative movement between the conductors to accommodate slightly different amounts of expansion and contraction of the parts of the penetrator assembly under temperature variations as a result of different coefficients of thermal expansion of the parts of the penetrator assembly, as described in U.S. Pat. No. 8,968,018 referenced above. Other contact arrangements may be provided in alternative embodiments. The two part conductor pin is made of a suitable rigid conductive material such as copper or the like. In other embodiments, the conductor pin may be in one part or may have two parts engaging within the housing bore rather than outside the bore as in the illustrated embodiment.

A cylindrical metal sealing sleeve 27 is brazed onto a recessed region 28 of the ceramic body at each end of the penetrator, and projects beyond the end of the penetrator. As best illustrated in FIG. 2, the first encapsulated end portion or bonded assembly 18 includes a cladding layer or outer layer 26 which extends over the forward end of conductor or conductor part 20 to form rounded tip 30, and a relatively thin sleeve portion 33 of cladding layer 26 extends rearward from tip 30 over the conductor part 20 up to the forward end of metal sealing sleeve 27 to encapsulate the otherwise exposed end of conductor 20. The conductor part 20 has an enlarged diameter forward end portion 34 forming inwardly facing shoulder or step 35, and a metal weld ring 36 forming part of the bonded assembly extends from the end of housing 14 up to step 35 and across the junction 38 between sealing sleeve 27 and the inner end of cladding layer 26. Weld ring 36 has an outer diameter equal or substantially equal to the diameter of housing recess 28. In some embodiments, the cladding layer is joined to conductor part 20, weld ring 36, and sealing sleeve 27 by brazing with a braze filler between opposing surfaces of the parts, or by eutectic bonding. The cladding material is a corrosion resistant metal or alloy which is inert or substantially inert to the subsea environment, unlike the conductive pin which is typically of copper or the like. Suitable corrosion resistant metals or alloys are titanium or titanium alloy, nickel, stainless steel, Inconel®, and the like.

The second encapsulated end portion or bonded assembly 19 is illustrated in more detail in FIG. 3, and comprises a cladding layer or coating layer 40 which covers the outer end of conductor part 22 and extends inward over the outer surface of conductor part 22 up to the end 44 of insulating housing 14. Cladding layer 40 has a recess 45 in its outer surface extending from the inner end face 74 of the cladding layer up to step 75 (see FIG. 5C). Recess 45 is of the same dimensions as corresponding recess 28 at the outer end of housing 14, and the second metal sealing sleeve 27 is seated in the recesses 28, 45 and suitably bonded or brazed to the recesses in the cladding layer 40 and housing 14, as illustrated in FIG. 3. The outer surface of cladding layer 40 is shaped to form a cable connector along part of its length. The inner surface of cladding layer 40 is joined to the outer surface and outer end face of conductor pin part 22 by brazing with a braze filler between the opposing surfaces or by eutectic bonding. Cladding layer 40 is suitably of the same corrosion resistant metal or alloy as cladding layer 26 at the opposite end of the penetrator assembly. In one embodiment, the cladding material was titanium or titanium alloy which is inert or substantially inert to the seawater environment.

Figure 4A:
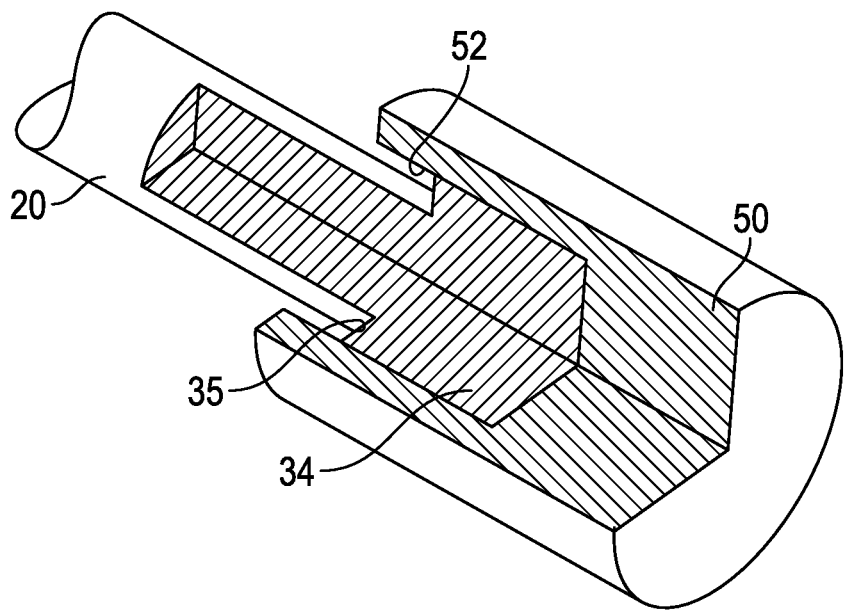
FIGS. 4A-4D are cut away views illustrating one embodiment of a method of making the bonded front end portion of FIG. 2 and joining it the remainder of the assembly.

FIGS. 4A to 5C illustrate one embodiment of a method of manufacturing a penetrator assembly with encapsulated conductor end portions 18 and 19 as illustrated in FIGS. 1 to 3. FIGS. 4A to 4D illustrate steps in the manufacture of first encapsulated end portion 18 with a rounded tip 30. This version may be provided at both ends of the penetrator assembly in some embodiments, or at one end only as illustrated in FIGS. 1 to 3. The first step is to make or form a cylindrical piece 50 of the cladding material with a bore 52 of predetermined diameter extending inward from one end of piece 50. At this stage, the cylindrical wall of piece 50 is relatively thick, and thicker than the desired final wall thickness of the finished part. Enlarged end portion 34 of conductor pin or pin part 20 is then inserted into the bore 52 in cladding piece 50 as illustrated in FIG. 4A, until it contacts the inner end of bore 52. In one embodiment, the respective diameters of pin end portion 34 and bore 52 are selected so that portion 34 is a press fit in bore 52. In another embodiment, space is provided for a braze filler between the opposing faces of portion 34 and bore 52. The conductor end portion 34 is then joined to the cladding piece 50 by eutectic bonding (in the case of a press fit engagement) or brazing (where a braze filler is used). In eutectic bonding, the system is heated to the eutectic point so as to fuse the cladding layer to the conductor end portion, forming a eutectic bond. Alternatively, a brazing alloy is placed between the cladding layer and the conductor end portion, and the assembly is brazed.

Figure 4B:
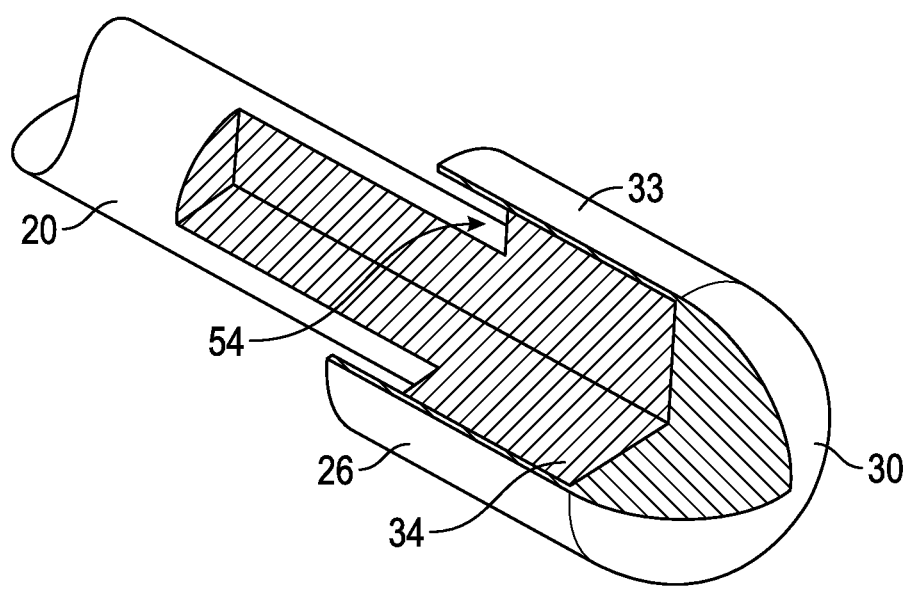

The external surface of cladding piece 50 is then machined to form the rounded conductor pin tip 30 and a relatively thin walled sleeve portion 33 extending inward from tip 30, as illustrated in FIG. 4B, forming a cap-like shape. The cladding is machined to form as thin a layer as possible so that the electrical resistance through the cladding layer is a low as possible while still providing an effective corrosion barrier. In one embodiment, the final thickness of sleeve portion 33 is substantially equal to the thickness of metal sealing sleeve 27, and in one embodiment the cladding layer was of titanium and had a final thickness in the range from about 0.01 inches to 0.1 inches. However, this thickness may vary depending on the temperature and pressure rating of the part, the size of the part, and the material combination chosen. The initial thickness of the cladding layer prior to machining is chosen so that it has sufficient mechanical stability on its own until it is brazed or bonded to the conductor. The range of thickness prior to machining may be 0.25 to 0.5 inches or more.

Figure 4C:
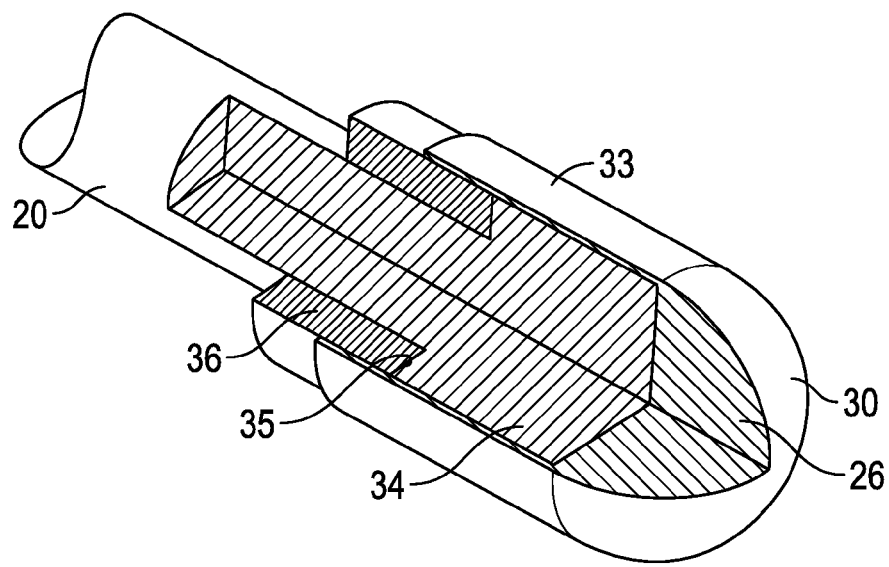
Figure 4D:
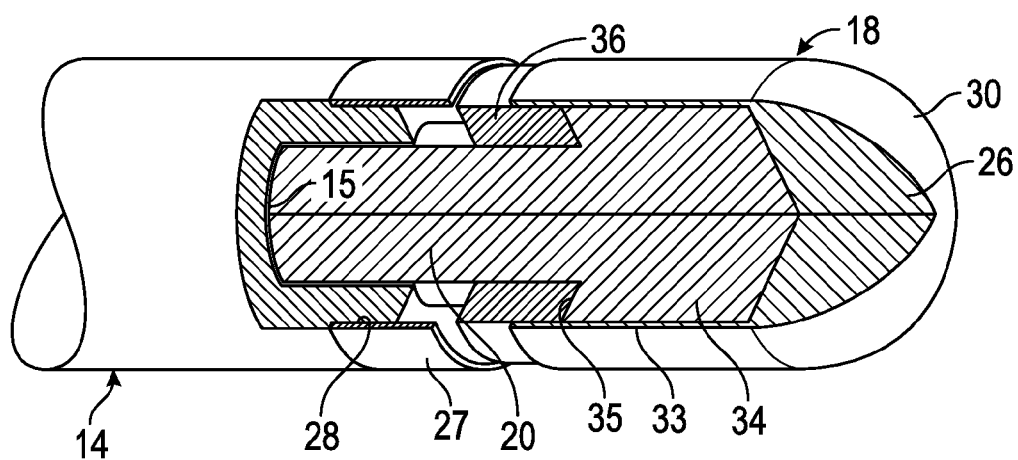

As illustrated in FIG. 4B, the machined cladding layer or sleeve 33 extends inward beyond the enlarged end portion 34 of conductor pin or part 20 to leave a gap 54 between the cladding layer and smaller diameter part of the pin. Weld ring 36 is engaged over the conductor part 20 and inserted into the gap 54 inside cladding layer until the forward end of the ring 36 engages the step or shoulder 35 of the enlarged end portion 34 of conductor part 2, as illustrated in FIG. 4C. The conductor part 20 is then inserted into the bore 15 in insulator housing 14 until the end face of housing 14 abuts the inner end of weld ring 36 and the inner end of the cladding layer or sleeve 33 approaches the end of metallic sleeve 27 for the welding operation, as in FIG. 2. FIG. 4D illustrates the conductor end portion 18 partially engaged in the respective end of insulator housing 14, with conductor part 20 extending into the bore 15 in housing 14 and the sealing sleeve 27 about to engage in over the projecting end of weld ring 36. End portion 18 continues to be moved towards housing 14 until the end of weld ring 36 abuts the opposing end face of housing 14, as illustrated in the fully assembled view of FIG. 2. The weld ring 36 is sized such that, once fully assembled, the metallic sleeve 27 and the cladding sleeve portion 33 are close enough for the welding operation to join them successfully, without abutting the metallic sleeve 27 and the cladding sleeve portion 33. The weld ring 36, metallic sleeve 27, and inner end of the cladding layer are then joined by welding.

Figure 5A:
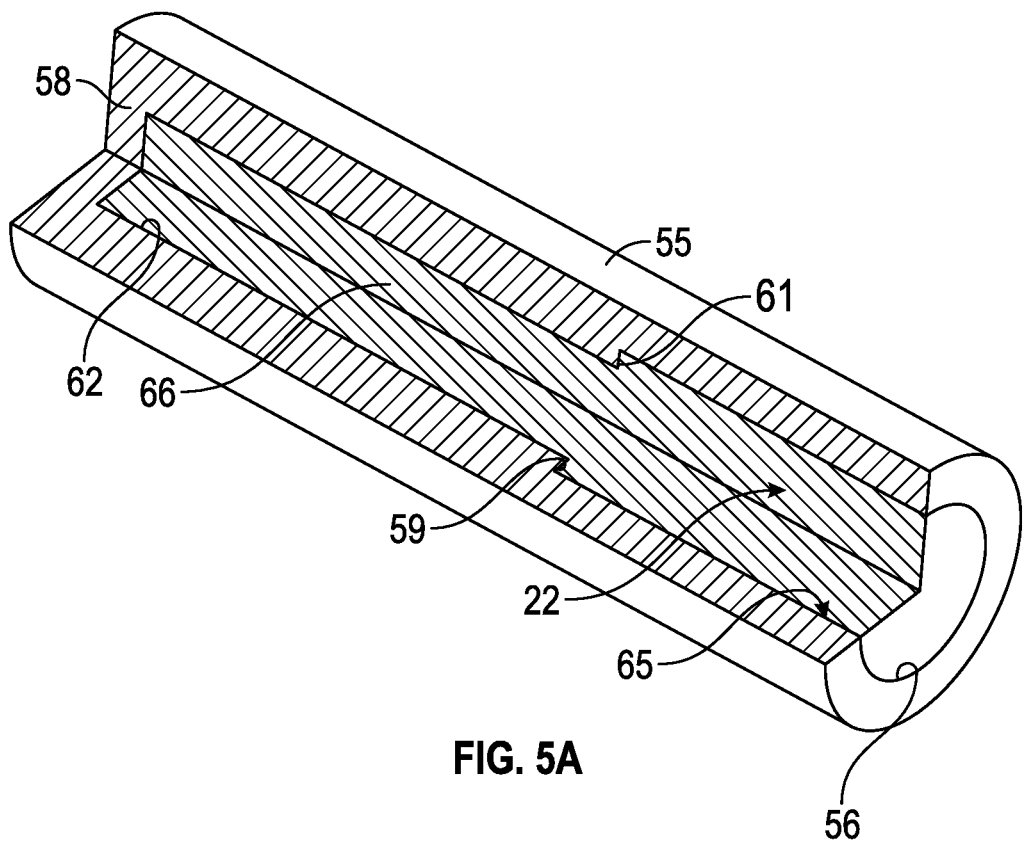
FIGS. 5A to 5C are cut away perspective views illustrating steps of one embodiment of a method of making the bonded rear end portion of FIG. 3 and joining it to the remainder of the penetrator assembly.
Figure 5B:
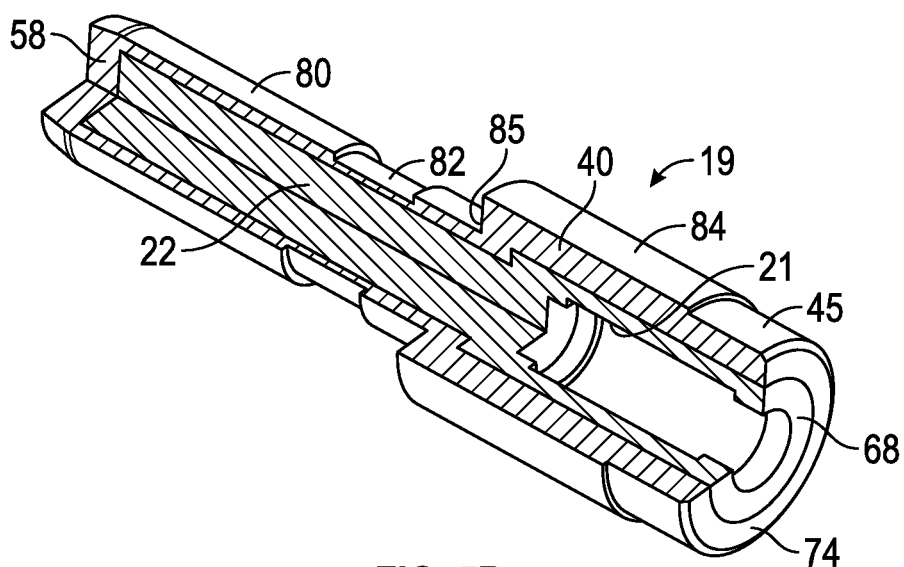
Figure 5C:
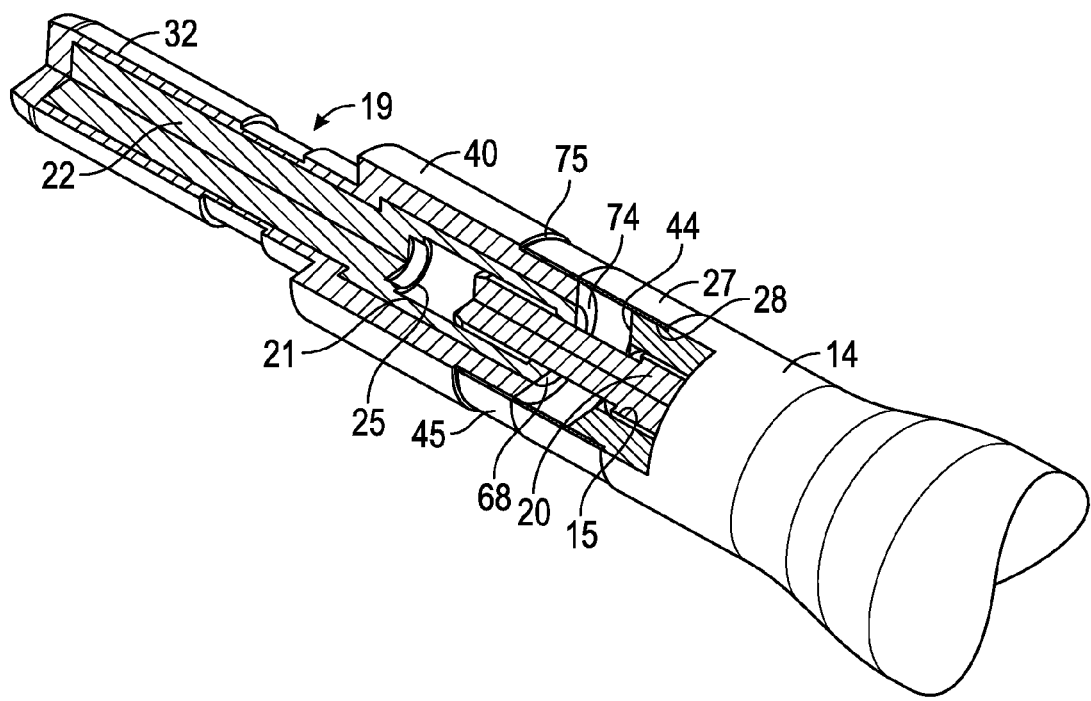

FIGS. 5A to 5C illustrate steps in a method of manufacturing second encapsulated end portion 19 of the conductor pin. This version may also be provided at both ends of the penetrator assembly in some embodiments, or at one end only as illustrated in FIGS. 1 to 3. First, a cylinder 55 of cladding material is formed with a cylindrical outer surface of uniform diameter and a bore 65 extending inwards along most of the length of piece 55, terminating at end wall 58. The bore 65 is formed with a step 59 in diameter between larger diameter first portion 56 and smaller diameter inner portion 62. Conductor part 22, which has a stepped outer diameter matching the diameters of bore portions 62 and 56, respectively, is then inserted into bore 65 until step 61 in its outer diameter engages the step 59 in bore 65, as illustrated in FIG. 5A. At this stage, the cylindrical wall of piece 55 is relatively thick, and thicker than the desired final wall thickness of the finished part. The length of conductor part 22 is equal to the length of bore 65 in cylinder 55. The conductor part 22 is either a press fit in bore 65 or a braze filler is provided between opposing surfaces of conductor part 22 and bore 65.

Once conductor part 22 is fully inserted into the bore 65, the parts are joined either through brazing with the braze filler or by eutectic bonding where part 22 is press fit into bore 65. Next, the outer surface of cladding layer 55 is machined to reduce its thickness so as to reduce the electrical resistance through the cladding while still providing an effective corrosion barrier. The outer surface is also machined to form the desired outer machined surface shape of a cable end connector in the final cladding layer 40, as illustrated in FIG. 5B. In one embodiment, the outer surface has a first surface portion 80 extending from end wall 58 to step 85 and having an annular recess 82 prior to step 85, and a second surface portion 84 of larger diameter than portion 80 extending from step 85 towards the forward end face 74. Recessed portion 45 is formed at the forward end of cladding layer 40 for seating the metal sealing sleeve 27. A blind bore 21 is machined into end face 68 of conductor part 22, with shape and dimensions configured for telescoping engagement with the mating end of conductor 20 when the parts are assembled. The thickness of the cladding layer prior to machining and the final thickness of the different regions of cladding layer 40 may be in the thickness ranges described above for the cladding layer of encapsulated end portion 18.

The assembled encapsulated end portion 19 is then moved into engagement with the end of the main insulator or insulated housing 14 until the metal sealing sleeve 27 is seated in recess 45 and abuts the edge or end face 75 of the recess, and the projecting end of conductor part 20 engages in machined bore 21 of conductor part 22, as illustrated in FIG. 3. FIG. 5C illustrates the projecting end of conductor part 20 partially engaged in the bore 21, just before the metal sealing sleeve 27 engages in recess 45. When the projecting end is fully engaged in bore 21 as in FIG. 3, the end face 74 of cladding layer 40 abuts the opposing end face 44 of housing 14. The sleeve 27 is joined to cladding layer 40 by welding at welded interface 75.

The cladding layer and welded or brazed sleeve at each end of the penetrator pin assembly or subassembly completely or substantially isolate the conductor pin from potentially corrosive interactions with fluids such as seawater or other contaminants as well as reducing the galvanic potential at the exposed interfaces, as compared with traditional penetrator assemblies. The cladding layer walls are made as thin as possible in order to keep the electrical resistance through the cladding layer as low as possible while still providing an effective corrosion barrier. In some embodiments, the cladding layer of each end portion may be in the ranges discussed above, and each cladding layer may be of varying thickness along its length according to installation requirements. At the same time, the fit between the inner conductor part and outer cladding layer must be as close as possible where they are bonded by a eutectic joint, and the parts are assembled as a press or shrink-fit in some embodiments. The cladding layer walls are initially relatively thick to allow for pressing and heating in the bonding step (either brazing with a braze layer between the parts or by a eutectic joint), followed by post-machining of the cladding layer to the desired external shape. Internal features, such as the bore 21 in conductor part 22, are also post-machined in order to avoid potential distortion of the bore walls during pressing and heating. The metallic sleeves or sealing sleeves 27, and the cladding layers at each end of the penetrator assembly, and the weld ring 36 are all made from one or more of the corrosion resistant metals and alloys listed above, and may all be of the same material in some embodiments.

The above penetrator assembly and method of making the assembly with physically encapsulated conductor end portions protects conductors of copper or the like by completely encasing them with a corrosion-resistant material and reducing the number of dissimilar materials at exposed interfaces. The encapsulated electrical power conductors are hermetically sealed from corrosive environments without significantly increasing Joule heating in operation, by making the cladding layer walls as thin as possible so that the electrical resistance through the cladding layer is kept relatively low. This results in a durable, hermetically sealed, corrosion-resistant penetrator assembly.

In the above embodiments, a hermetic, physically encapsulated electrical penetrator assembly is provided which is suitable for use in high temperature, high pressure, high voltage, and high current application, such as powering of subsea electrical submersible (ESP) pump equipment which is used to pump hydrocarbons in oil rig installations and the like. Other applications for the penetrator assemblies in the above embodiments include high temperature, high pressure downhole electrical penetrations and other electrical penetrations used in subsea equipment of various types. The penetrator assemblies are scalable for a variety of current and voltage requirements. The physical encapsulation method described above may also be used for other applications where end portions of electrical conductor assemblies are exposed to subsea and other harsh environments which may lead to corrosion at welded interfaces.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

We claim:

1. An electrical penetrator device, comprising:
   an outer housing of non-conductive, insulating material having a through bore and opposite first and second ends;
   at least one conductive pin of a first conductive material formed in one or two parts extending through the housing and having a first end portion and a second end portion extending out of the respective first and second ends of the housing, the first and second end portions terminating at respective first and second end faces;
   a first cladding layer bonded over at least part of the first end portion of the at least one conductive pin to cover the first end face and exposed outer surfaces of the at least one conductive pin outside the first end portion of the housing to form a first bonded assembly; and
   a second cladding layer bonded over the second end portion of the at least one conductive pin to cover the second end face and exposed outer surfaces of the at least one conductive pin outside the second end portion of the housing to form a second bonded assembly, the material of the first and second cladding layers comprising a corrosion resistant conductive material different from the first conductive material.

2. The device of claim 1, wherein a first metallic sealing sleeve is bonded between the housing and the first bonded assembly, and a second metallic sealing sleeve is bonded between the housing and the second bonded assembly.

3. The device of claim 2, wherein the first end portion of the at least one conductive pin is of stepped diameter with a larger diameter outer end forming an inwardly facing step and the first bonded assembly further comprises a weld ring engaged over the first end portion of the at least one conductive pin and extending between the first end of the housing and the inwardly facing step, the first cladding layer having a tip extending over the first end face of the at least one conductive pin and a sleeve portion which extends inward from the tip over the outer end of the at least one conductive pin and the weld ring and has an inner end bonded to an outer end of the first metallic sealing sleeve.

4. The device of claim 3, wherein the first metallic sealing sleeve extends outward from the first end of the housing over the weld ring up to inner end of the first cladding layer.

5. The device of claim 1, wherein the cladding layer of at least one of the first bonded assembly and the second bonded assembly has a rounded tip covering the end face of the respective end portion of the at least one conductive pin and is configured for mating engagement in a socket of a subsea connector unit.

6. The device of claim 1, wherein the cladding layer of at least one of the first bonded assembly and the second bonded assembly is shaped to form a cable connector.

7. The device of claim 1, wherein the cladding layer of the first bonded assembly has a rounded tip covering the end face of the first end portion and is configured for mating engagement in a socket of a subsea connector unit, and the cladding layer of the second bonded assembly is configured for attachment to a subsea cable.

8. The device of claim 1, wherein the at least one conductive pin comprises a first conductor and a second conductor, the second conductor having an inwardly extending bore and the first conductor having an end portion telescopically engaged in the bore to form a telescopic interface between the first and second conductors.

9. The device of claim 8, wherein the interface between the first and second conductors is located outside the second end of the housing and within the second cladding layer.

10. The device of claim 1, wherein the pin end portions and cladding layer are eutectically bonded in face to face engagement.

11. The device of claim 1, wherein the end portions of the at least one conductive pin and the cladding layers are joined by brazing.

12. The device of claim 1, wherein the corrosion resistant conductive material of the first and second cladding layer is selected from the group consisting of: titanium, titanium alloy, nickel, stainless steel, and an alloy of nickel, chromium and iron.

* * * * *